United States Patent
Shah

(10) Patent No.: US 11,252,145 B2
(45) Date of Patent: Feb. 15, 2022

(54) CROSS-DEVICE ACCESS TO ONE-TIME PASSWORDS

(71) Applicant: Microsoft Technology Licensing, LLC, Redmond, WA (US)

(72) Inventor: Shrey Nitin Shah, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 306 days.

(21) Appl. No.: 16/228,078

(22) Filed: Dec. 20, 2018

(65) Prior Publication Data

US 2020/0204540 A1 Jun. 25, 2020

(51) Int. Cl.
*H04L 29/06* (2006.01)
*G06N 20/00* (2019.01)
(Continued)

(52) U.S. Cl.
CPC ......... *H04L 63/0838* (2013.01); *G06N 20/00* (2019.01); *H04L 9/3228* (2013.01); *H04L 63/0853* (2013.01); *H04W 4/14* (2013.01); *H04W 12/068* (2021.01); *G06F 21/602* (2013.01); *H04L 9/14* (2013.01); *H04W 4/80* (2018.02)

(58) Field of Classification Search
CPC ............. H04L 63/0838; H04L 63/0853; H04L 9/3228; H04L 9/14; H04W 12/0608; H04W 4/14; H04W 4/80; G06N 20/00; G06F 21/602; G06F 21/31
See application file for complete search history.

(56) References Cited

U.S. PATENT DOCUMENTS

| 10,182,048 | B1 * | 1/2019 | Sabanayagam ......... G06F 21/45 |
| 2009/0199272 | A1 * | 8/2009 | Gopalakrishna .... H04L 63/0838 726/3 |

(Continued)

FOREIGN PATENT DOCUMENTS

WO 2017003379 A1 1/2017

OTHER PUBLICATIONS

"International Search Report and Written Opinion Issued in PCT Application No. PCT/US19/065833", dated Jun. 23, 2020, 14 Pages.

*Primary Examiner* — Robert B Leung

(57) ABSTRACT

In non-limiting examples of the present disclosure, systems, methods and devices for providing cross-device access to one-time passwords are presented. A user may provide sign-in credentials to a secure service via an application or website user interface. The user may be prompted to authenticate the user's identity by confirming a one-time-password sent from the secure service to a secondary device via an electronic message. The secondary device may analyze received messages, or message notifications, to determine whether they include a one-time-password. If a one-time-password is identified in a received message, the one-time-password may be automatically sent from the secondary device to a target computing device. The one-time-password may be sent securely to the target computing device via Bluetooth, a public-private key process, and/or a cloud-based authentication mechanism. The one-time-password may be automatically inserted into a one-time-password field or copied to a notepad or password manager.

19 Claims, 11 Drawing Sheets

(51) Int. Cl.
   *H04L 9/32*      (2006.01)
   *H04W 4/14*      (2009.01)
   *H04W 12/06*     (2021.01)
   *H04W 4/80*      (2018.01)
   *G06F 21/60*     (2013.01)
   *H04L 9/14*      (2006.01)

(56) References Cited

U.S. PATENT DOCUMENTS

| | | | |
|---|---|---|---|
| 2009/0209243 A1* | 8/2009 | Brown | H04M 3/53333 |
| | | | 455/418 |
| 2011/0276495 A1 | 11/2011 | Varadarajan et al. | |
| 2013/0150099 A1* | 6/2013 | Chen | H04L 51/14 |
| | | | 455/466 |
| 2017/0237726 A1* | 8/2017 | Wang | H04W 12/06 |
| | | | 726/7 |
| 2017/0300816 A1* | 10/2017 | Ferrara | G06N 20/00 |
| 2018/0157824 A1* | 6/2018 | Daly | H04L 63/0428 |
| 2018/0176212 A1* | 6/2018 | Nair | G06F 21/32 |
| 2019/0026446 A1* | 1/2019 | Hallenborg | G06F 21/40 |
| 2019/0297119 A1* | 9/2019 | Vashisht | H04L 65/4023 |
| 2019/0372949 A1* | 12/2019 | Sanciangco | H04W 12/04 |

\* cited by examiner

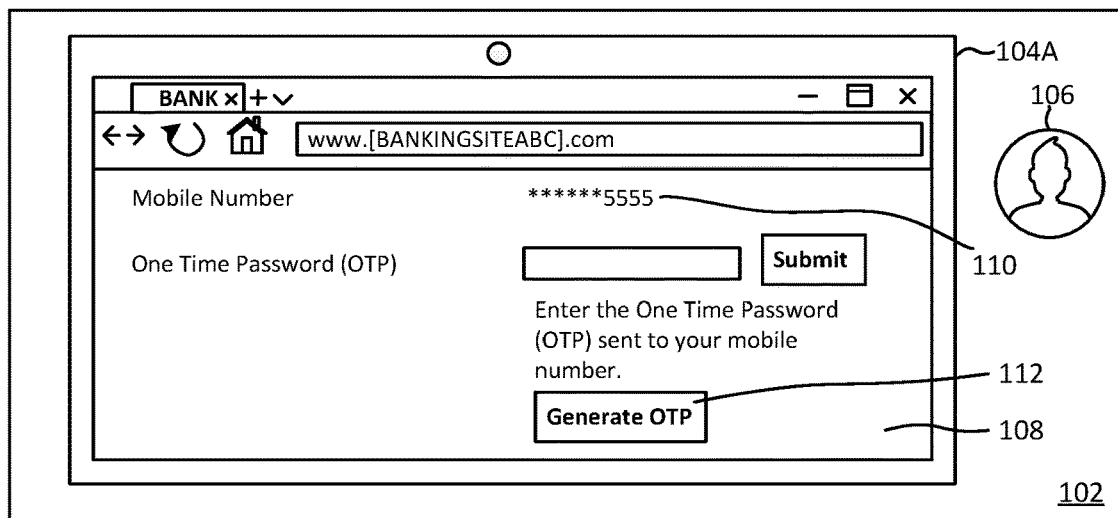
FIG. 1
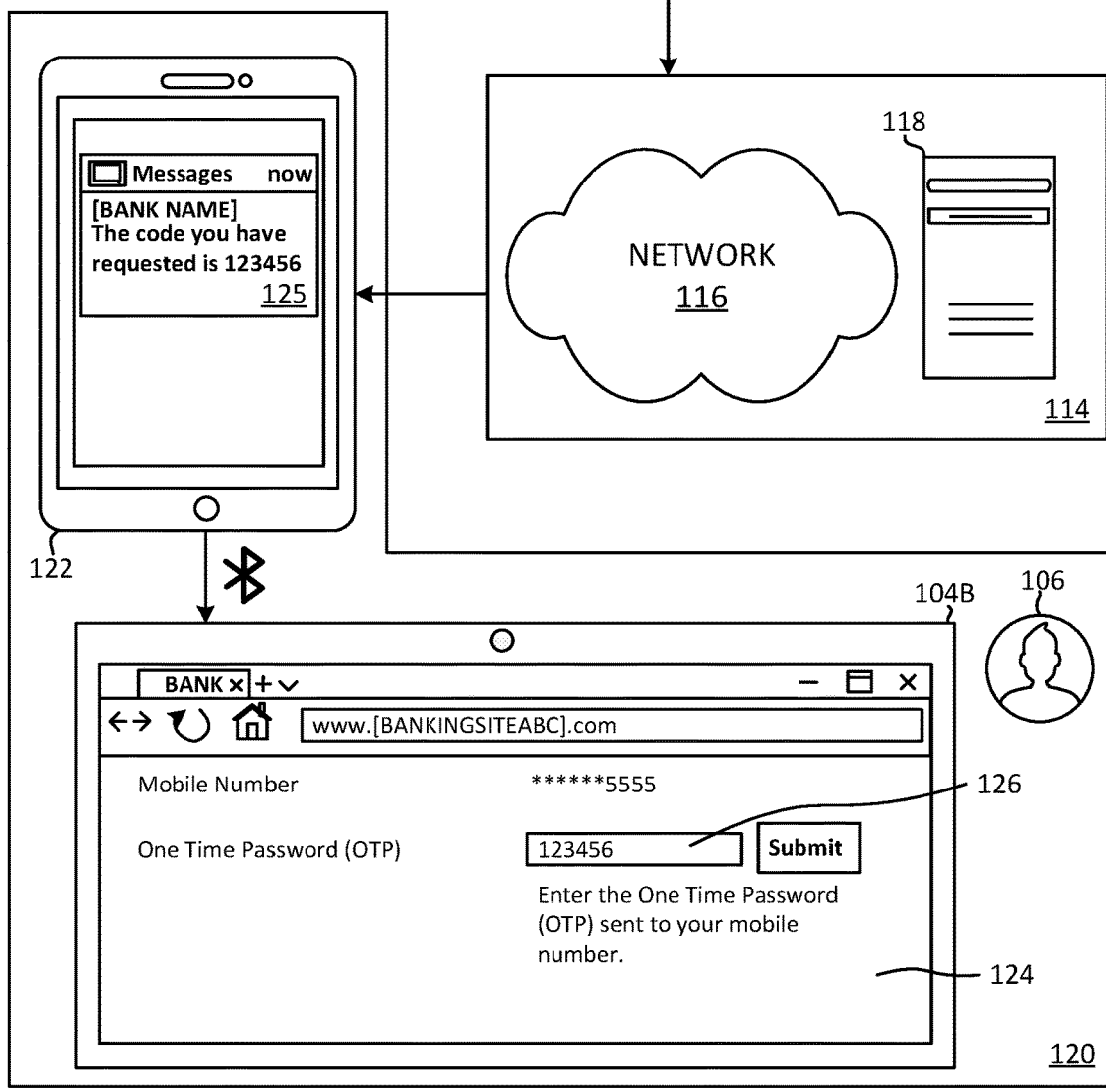

CROSS-DEVICE ACCESS TO ONE-TIME PASSWORDS

BACKGROUND

One-time-passwords are increasingly being used by secure services to authenticate the identity of users. Typically, a user adds a mobile number and/or email address that the user can receive messages at to the user's secure service account, and when the user attempts to sign into the secure service, a one-time-password is sent to the user's email and/or an electronic message that includes the one-time-password is sent to the user's mobile device. This process can be unwieldy in that it then requires a user to either sign into the user's email account and/or open the message on the user's mobile device, and manually enter the one-time-password from the email or message in the one-time-password field on a target device that the user is attempting to access the secure service from. This can be especially trying for users that have visual impairments or reading disabilities.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for providing cross-device access to one-time passwords. When a user attempts to access the user's secure service account (e.g., a banking service, a cloud-based storage service, a shopping service, etc.), the service may provide an additional level of security by requiring the user to authenticate her identity via a one-time-password. The user may have previously added a mobile number and/or email address to their service account, and the service may send the one-time-password to a device associated with that mobile number or the email account associated with the email address. According to examples, when a mobile device receives a new electronic message (e.g., an SMS message, an email message), the mobile device may analyze that message to determine whether it includes a one-time-password. In other examples, when the mobile device receives a new electronic message, the mobile device may analyze a notification corresponding to the message to determine whether it includes a one-time-password. If a determination is made that the message does include a one-time password, the mobile device may either extract the one-time-password from the message and/or notification and send it via a secure connection to the target device that the user is attempting to access her account ton, or the mobile device may send the entirety of the message and/or notification that contains the one-time-password to the target device via a secure connection.

BRIEF DESCRIPTION OF THE DRAWINGS

Non-limiting and non-exhaustive examples are described with reference to the following figures:

FIG. 1 is a schematic diagram illustrating an example distributed computing environment for assisting with cross-device one-time-password authentication via a Bluetooth transfer mechanism.

DETAILED DESCRIPTION

Figure 2:
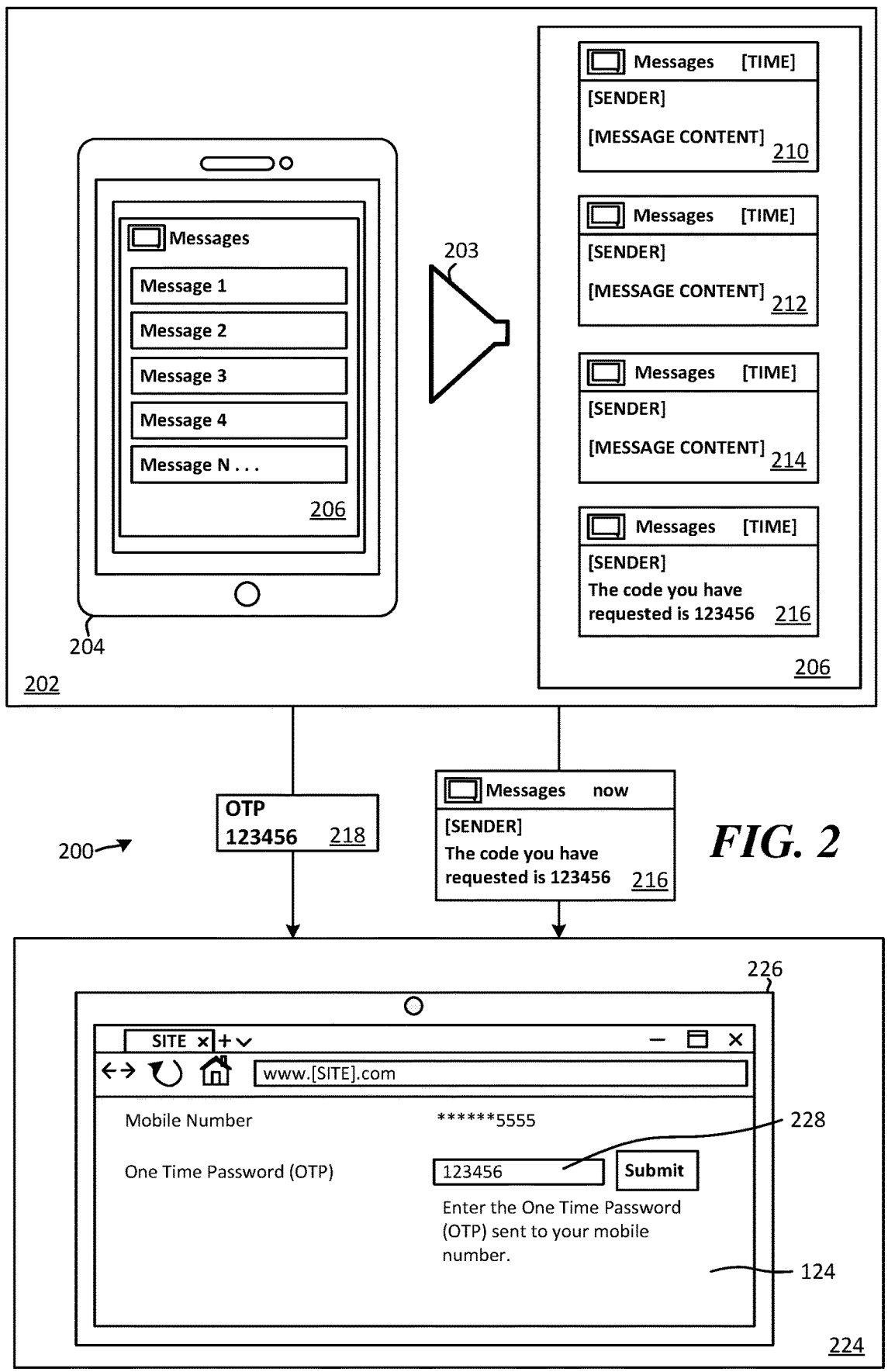
FIG. 2 illustrates the filtering of electronic messages and/or notification for identification of a one-time-password for use in cross-device one-time-password authentication.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Examples of the disclosure provide systems, methods, and devices for providing cross-device access to one-time-passwords. As used herein "one-time-password" refers to a form of an authorization secret. Thus, while in some examples a one-time-password may comprise a set of numbers, letters and/or symbols, in other examples a one time-password may comprise an image with cryptographic properties, a QR code, etc. According to examples, when a user attempts to sign into the user's account for an online service (e.g., the user's online banking account, the user's cloud storage account, etc.), the online service may require that the user authenticate her identity by entering a one-time-password that is sent to the user via an electronic message. The electronic message may be sent to a device that the user has registered a number for with the online service and/or an email address that the user has registered with the online service. In an example, when a user's computing device receives new messages, it may analyze those messages to determine whether they contain one-time-passwords. In some examples, the entirety of each incoming message may be analyzed by the computing device. In other examples, the computing device may first analyze the identity of the sender of a received message, and determine whether there is match for the sender on a known list of one-time-password senders. If there is a match, then the computing device may analyze the rest of the message to determine whether the message contains a one-time-password. In some examples, rather than analyzing the messages themselves, the computing device may analyze the notifications corresponding to the messages. For example, the computing device may analyze the image data corresponding to a received message to determine whether it includes a one-time-password and/or a sender corresponding to a service that sends one-time-passwords.

According to examples, if a one-time-password is identified in a received message, the computing device that received that message may automatically send the message and/or the one-time-password contained in that message to a target device (i.e., the device on which the user is attempting to sign into the online service). The device that received the message sends the message and/or the one-time-password to the target device in a secure manner. In some examples, the message and/or one-time-password may be sent to the target device via a Bluetooth connection. In other examples, the message and/or one-time-password may be sent to the target device via a distributed computing network utilizing a public-private key mechanism. In still other examples, the message and/or one-time-password may be sent to the target device via a distributed computing network utilizing a cloud-based application authentication mechanism. In some examples, when the one-time-password is received by the target device and/or the one-time-password is extracted from a message received by the target device, the one-time-password may be automatically inserted into a one-time-password field in the application and/or website user interface for the service that the user is attempting to log into. In additional examples, the one-time-password may be automatically copied to a notepad and/or a password manager on the target computing device.

In some examples, a notification that includes a one-time-password may be pushed via Bluetooth connection to a target device from the computing device that received the one-time-password via that notification. In examples, a Bluetooth profile (e.g., Message Access Profile (MAP), a Generic Attribute Profile (GATT)) may be utilized in orchestrating the exchange of messages between a device that receives a message and a target device. Thus, when the target device receives the notification and/or message, it may extract the one-time-password and insert it into a one-time-password field (e.g., in a browser on the target device, in an application on the target device), and/or the one-time-password may be automatically copied by the target device to a notepad and/or a password manager on the target computing device. The use utilization of such Bluetooth profiles may be especially useful in scenarios where SMS/notifications cannot be accessed programmatically via software running on a computing device that initially receives the one-time-password.

The systems, methods, and devices described herein provide technical advantages for providing cross-device access to one-time passwords. Processing costs associated with users having to manually open and scroll through multiple messages to identify a one-time password and subsequently type that password into a one-time-password field on a target device are reduced utilizing the mechanisms described herein. Processing costs may also be reduced via the mechanisms described herein by only performing the full message analysis (e.g., pattern recognition models, machine learning models) performed by a computing device for those messages that are determined to have been sent by a service that requires one-time-password authentication. That is, filters may be applied to received messages such that only those messages that are likely to include one-time-passwords are fully analyzed. The time required to securely authenticate users via one-time-passwords is also significantly reduced by automating the process on the secondary devices where electronic messages containing the one-time-passwords may be received (automating identification of the one-time-passwords from messages, automating extraction of the one-time-passwords from the messages and/or message notifications), as well as automating the process on the target devices where the one-time-passwords may be entered to access a secure domain (e.g., extracting the one-time-password from a received message, inserting the one-time-password into a one-time-password field).

FIG. 1 is a schematic diagram illustrating an example distributed computing environment 100 for assisting with cross-device one-time-password authentication via a Bluetooth transfer mechanism. Computing environment 100 includes one-time-password pre-target sub-environment 102, one-time-password target sub-environment 120, and network and processing sub-environment 114. Computing device 104A and 104B are the same computing device on which user 106 has accessed a website that requires user 106 to authenticate his identity via a on-time-password mechanism. Although a website is shown in the illustrated example, the same principles described in relation to FIG. 1 would generally also apply to one-time-password authentication for an application executed on computing device 104A/104B.

As shown in one-time-password target sub-environment 120, user 106 has accessed a banking website ([BANKINGSITEABC].com), and specifically the sign-in page for user 106's account for that bank. In examples, the bank associated with BANKINGSITEABC.com may store a plurality of user identities on one or more computing devices, such as server computing device 118, and associate those identities with mobile numbers and/or email addresses for each username. Thus, when a user attempts to access his banking account utilizing a username via the banking website and/or banking application, a service associated with the banking website and/or application can automatically send a one-time-password to the requesting user's mobile device and/or email address. After submitting a user-name to the banking website, user interface 108 is caused to be displayed on computing device 104A, which requires user 106 to provide a one-time-password in the one-time-password field of the website before granting user 106 access to his account.

In this example, user 106 has chosen to have the one-time-password sent to his mobile device, with a phone number ending in "5555". Thus, when user 106 selects user interface element 112, "Generate OTP", a one-time-password is sent, via network 116, to user 106's mobile device (i.e., mobile device 122). Thus, user 106's mobile computing device 122 receives one-time-password message 125 from the banking service, which includes the name of the bank in the "sender" field, in addition to the one-time-password in the body of the message. Specifically, one-time-password message 125 states "The code you have requested is 123456".

According to some examples, an application and/or operating system extension associated with mobile computing device 122 may identify one-time-passwords when (or approximately when) they are received via an electronic messaging application, such as an SMS messaging application. In some examples, whether via an application and/or operating system extension, mobile computing device 122 may analyze each message that is received via an electronic messaging application, and/or mobile computing device 122 may analyze messages from the electronic messaging application periodically. In analyzing the messages, mobile computing device 122 attempts to identify one-time-passwords from those messages. In some examples, the mobile computing device 122 may utilize a filter and only fully analyze messages for one-time-passwords that have a sender in a "sender" field corresponding to known one-time-password senders, therefore significantly reducing the processing costs associated with reviewing full content from every received message. In additional examples, rather than analyzing the messages themselves, mobile computing device 122 may analyze notification information corresponding to incoming messages to determine whether a one-time-password has been received. For example, mobile computing device 122 may utilize an optical character recognition engine in association with a notification engine to determine whether an incoming message includes a one-time-password. To identify a one-time-password, mobile computing device 122 may apply one or more of: a password pattern recognition model; and/or machine learning model, to a message and/or its notification. In examples where a machine learning model is applied to identify a one-time-password, that model may be manually trained on one or more manually classified datasets until a sufficient degree of accuracy is obtained.

In the current example, mobile computing device 122 and computing device 104B have been paired via Bluetooth connection. Thus, according to examples, when mobile computing device 122 identifies a one-time-password from an electronic message and/or electronic message notification, mobile computing device 122 may securely communicate the identified one-time-password to computing device 104B via the secure Bluetooth connection. In this example, the one-time-password is caused to automatically populate one-time-password field 126 in the banking website (e.g., via a browser extension). However, it should be understood that there are other mechanisms for saving and/or pasting one-time-password information that has been sent to a target device, such as computing device 104B (e.g., a one-time-password may be pasted to a clipboard, a one-time-password may be surfaced via a password application, a one-time-password may be surfaced via a notification extension, etc.).

In the above-described example, mobile computing device 122 has determined that a one-time-password is present in message 125. Mobile computing device 122 has also extracted that one-time-password from message 125 (or the notification corresponding to message 125), and sent the one-time-password to computing device 104B via Bluetooth. However, other mechanisms are within the scope of the current disclosure. For example, mobile computing device 122, upon determining that message 125 includes a one-time-password, may send the entirety of message 125 to computing device 104B, via Bluetooth, for extraction of the one-time-password. In additional examples, if computing device 104B has been linked to the electronic messaging service such that when a message is received by mobile computing device 122, that message is automatically synced to computing device 104B (i.e., both devices receive messages for a single mobile number), computing device 104B may perform the one-time-password analysis and extraction all or in part on its end. For example, computing device 104B may have better processing power than mobile computing device 122, and therefore mobile computing device 122 may simply send messages to computing device 104B for one-time-password analysis where that analysis can be more efficiently performed.

FIG. 2 illustrates an example distributed computing environment 200 for the filtering of electronic messages and/or notifications for identification of a one-time-password for use in cross-device one-time-password authentication. Computing environment 200 includes OTP message reception sub-environment 202 and target device sub-environment 224. Although not shown, a user has accessed a website that requires one-time-password multi-device authentication prior to granting access to information associated with that user's account. As such, a service associated with that website has caused a one-time-password to be sent to an electronic messaging account associated with a mobile number that the user has registered with the service. In other examples a one-time-password may be additionally or alternatively sent by the service to an email address that the user has registered with the service.

In this example, the user trying to access an account that requires a one-time-password has registered a phone number associated with mobile computing device 204 with the corresponding account service (e.g., a banking account service, an insurance company account service, etc.). Thus, the one time-password has been sent to mobile computing device 204. In this example, a filter (represented by filter 203) is applied by mobile computing device 204 to identify a one-time-password in one or more messages that have been received by mobile computing device 204. However, in examples where the messaging service associated with the phone number for mobile computing device 204 has also been linked to computing device 226, the filtering may be applied to the messages at computing device 226, which may have better processing resources. Additionally, although the filter in this example is being applied to the messages themselves, in some examples, the filter may be applied to notifications corresponding to the messages.

The filter applied to messages 206 (message 210, message 212, message 214, message 216) may be applied to each message as it is received at mobile computing device 204, or the filter may be applied to messages 206 periodically (e.g., a determination may be made every second, every ten seconds, or every minute, as to whether one or new messages have been received by mobile computing device 204 and a filter may be applied to each newly received message). For example, when a new message is received by mobile computing device 204, an application associated with a messaging application and/or a one-time-password application may apply a filter to that message to determine whether it is sent by a sender that is known to require one-time-password authentication. For example, the application may determine whether the sending user matches a locally stored or remote list of known users/companies that require one-time-password authentication. If the sender is matched to that list, the application may then analyze the rest of the message to determine whether the message includes a one-time-password, and if so, the application may extract that one-time password for sending to a target device via a secure connection (e.g., Bluetooth, public-private key). In other examples, the application may simply identify whether the one-time password is included in the message, and if so, it may send the entire message to the target device via a secure connection. Additionally or alternatively, mobile computing device 204 may simply send every message it receives to a target device via a secure connection, and the target device may perform the analysis of the messages for extraction of the one-time-password.

For illustrative purposes, in this example, two different mechanisms for transferring the one-time-password from mobile computing device 204 to target computing device 226 are shown. In a first mechanism, the one-time-password has been identified from one of messages 206 on mobile computing device 204, the identified one-time-password has been extracted from the message by mobile computing device 204, and the extracted one-time-password 218 has been sent from mobile computing device 204 to target computing device 226 (i.e., the one-time-password has been unpackaged from its message and transferred in raw form) via secure connection. The extracted one-time-password 218 may then be automatically inserted into one-time-password field 228 on user interface 124 for the secure website displayed on target computing device 226.

In a second mechanism, a message 216 from messages 206 has been identified as including a one-time-password, and the entirety of message 216 is sent directly from mobile computing device 204 to target computing device 226 via secure connection. Target computing device 226 can then extract the one-time-password from message 216 and automatically insert it into one-time-password field 228 on the user interface 124 for the secure website displayed on target computing device 226. Thus, in the first mechanism, only the extracted one-time-password is sent from mobile computing device 204 to target computing device 226, and in the second mechanism, complete message 216 (including sender information, body information, etc.) is sent from mobile computing device 204 to target computing device 226 where the one-time-password can be extracted.

Figure 3:
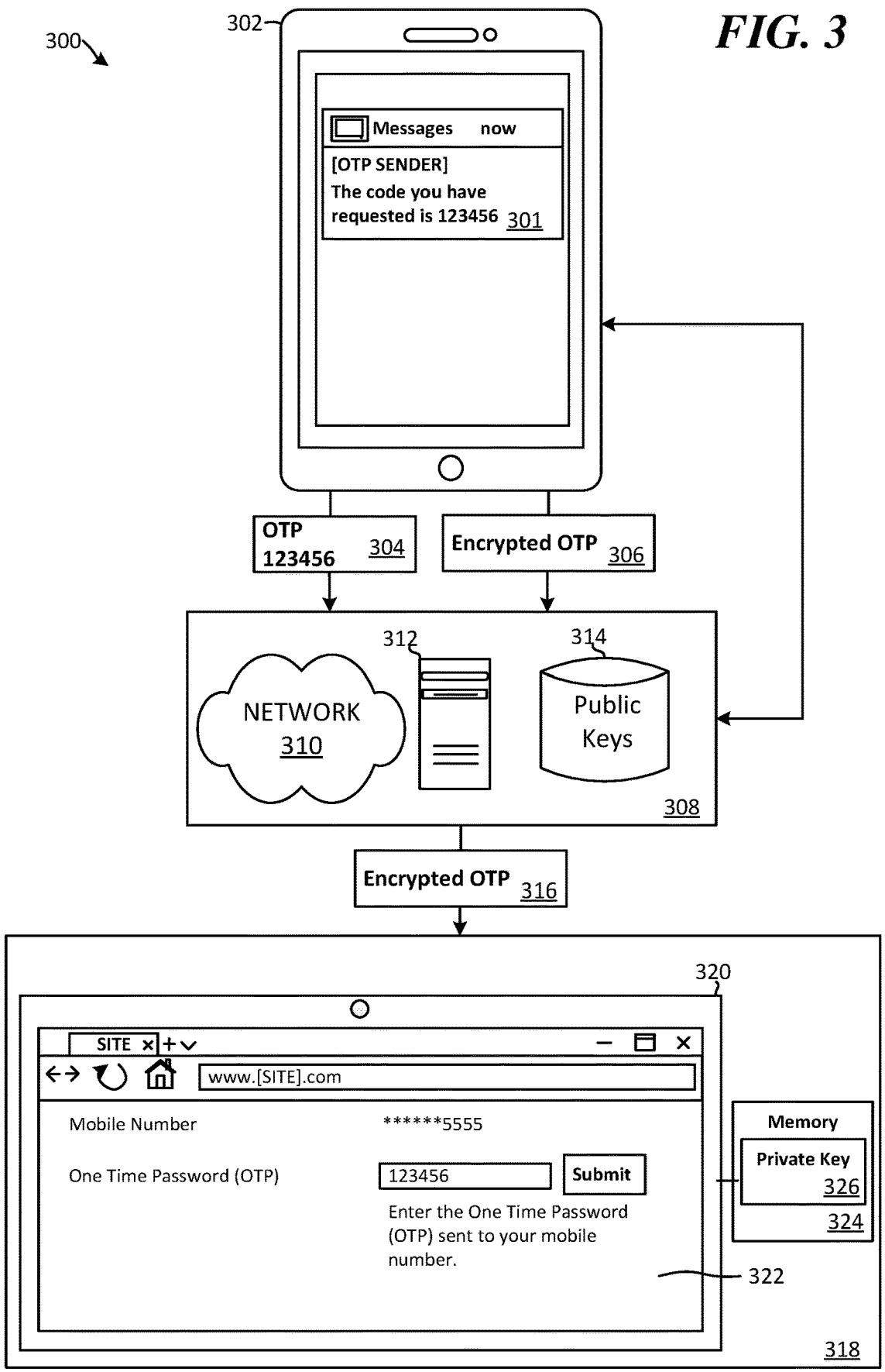
FIG. 3 illustrates an example distributed computing environment for assisting with cross-device one-time-password authentication via a public-private key mechanism.

FIG. 3 illustrates an example distributed computing environment 300 for assisting with cross-device one-time-password authentication via a public-private key mechanism. Computing environment 300 includes mobile computing device 302, which has received a one-time-password; network and processing sub-environment 308, which includes network 310, server computing device 312, and public keys storage 314; and target computing device sub-environment 318, where the one-time-password sent from mobile computing device 302 is received by target computing device 320.

Mobile computing device 302 receives message 301, which includes a one-time-password generated based on a user attempting to access a secure website associated with an account they have with a service connected to the website (e.g., a banking service, a cloud storage service, an insurance service, etc.). Message 301 may be received, via network 310, from a service that is operating, at least in part, on a remote computing device, such as server computing device 312. Although the user is described as attempting to access a secure website for this illustration, a cross-device one-time-password access as described herein may also be accomplished via these mechanisms based on an application sign-in process. When message 301 is received by mobile computing device 302, mobile computing device 302 may analyze that message and determine whether it contains a one-time-password. In some examples, the content of every message that is received by mobile computing device 302 may be analyzed to determine whether it contains a one-time-password. In other examples, only content from messages that are received from senders that are known to send one-time-passwords may be analyzed to determine whether they contain a one-time-password. In analyzing message 301 to determine whether it contains a one-time-password, mobile computing device 302 may apply a pattern recognition model the content of that message or a machine learning model that has been manually trained to detect one-time-passwords.

In some examples, once a determination has been made that message 301 contains a one-time-password, mobile computing device 302 may request a public key, if it does not already have one, from an encryption service. For illustrative purposes, mobile computing device 302 is shown as requesting a public key from public keys storage 314 in network and processing sub-environment 308, which may include a plurality of public keys for use by a plurality of users. Once the public key has been received by mobile computing device 302, mobile computing device 302 may use that public key to encrypt the one-time-password it has extracted from message 301. Mobile computing device 302 may then send the encrypted one-time-password 306/316, via network 310, to target computing device 320 (the same computing device from which the user has attempted to access the secure website/application data from). Target computing device 320 has a private key 326 which is stored locally in memory 324, which can then be utilized to decrypt encrypted one-time-password 306/316. Once the one-time-password is decrypted by target computing device 320 utilizing private key 326, the decrypted one-time-password can be automatically inserted into the one-time-password field of the website that the user is attempting to access, as illustrated on user interface 322 on target computing device 320.

In the above example, mobile computing device 306 first requests a public key from an encryption service, the public key is then sent to mobile computing device 302 from public keys storage 314, and mobile computing device 306 encrypts the one-time-password. However, in other examples, mobile computing device 302 may send the extracted one-time password 304 directly to the decryption service operating on server computing device 312, the decryption service may encrypt one-time-password 304 remotely from mobile computing device 302, and the encrypted one-time-password 316 may then be sent from the encryption service directly to target computing device 320. Thus, in some examples, rather than mobile computing device encrypting the one-time-password, the encryption service may encrypt the one-time-password.

Figure 4:
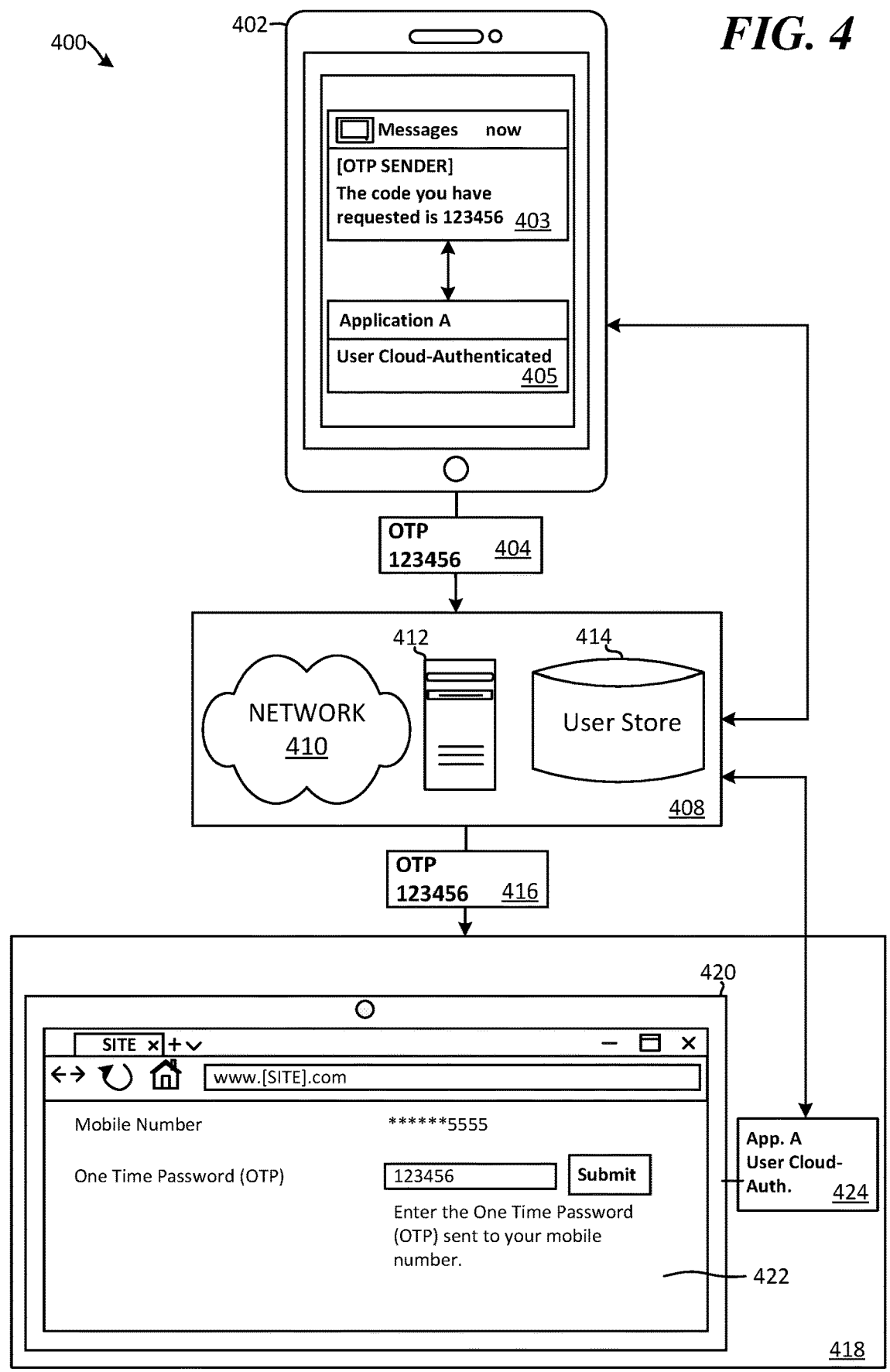
FIG. 4 illustrates an example distributed computing environment for assisting with cross-device one-time-password authentication via a cloud-based user credential mechanism.

FIG. 4 illustrates an example distributed computing environment 400 for assisting with cross-device one-time-password authentication via a cloud-based user credential mechanism. Computing environment 300 includes mobile computing device 402, which has received a one-time-password included in message 403; network and processing sub-environment 408, which includes network 410, server computing device 412, and user data store 414; and target computing device sub-environment 418. Mobile computing device 402 has received a one-time-password in message 403 based on a user attempting to access secure data associated with the user's account for an online service (e.g., a banking service, a cloud storage service, a job application service, etc.). The online service may operate all or in part on a remote computing device, such as server computing device 414, and the online service may send the one-time-password to mobile computing device 402 via network 410.

In some examples, the online service may be associated with a cloud-based application service, which can be utilized to authenticate the identity of a user attempting to access the secure data from the service, as well as to authenticate that the devices associated with the one-time-password (i.e., mobile computing device 402 and target computing device 420) are being accessed by the user. For example, as shown on the user interface of mobile computing device 402, application A 405, which may be a cloud-based productivity application, a cloud-based security application, etc., has been successfully signed into by a user operating mobile computing device 402. That is, a user has accessed application A 405, which operates at least in part in the cloud, from mobile computing device 402, and utilizing her sign-in credentials for application A 405, the cloud-based application has authenticated those credentials via user data store 414, which may contain username-credential pairs that can be utilized to authenticate users of application A 405.

However, prior to mobile computing device 402 sending one-time-password 404/416 to target computing device 420, target computing device 420 must also be authenticated as belonging to, or being currently utilized by, the accessing user. As such, the accessing user, utilizing target computing device 420, accesses application A 424, which may be the same or a different application as application A 405, by providing application A 424 with a sign-in username and credentials, which are provided to Application A 424 in network and processing sub-environment 408. The provided username and credentials, in the same manner as described above with regard to application A 405, are confirmed utilizing user data store 414. Once the user has been successfully signed in to a cloud-based account for both of mobile computing device 402 and target computing device 420, the one time password 404/416, which may have been extracted by mobile computing device 402 from message 403, may be sent from mobile computing device 402, via network 410, to target computing device 420. In some examples, one-time-password 404/416 may be sent from mobile computing device 402 to target computing device 420 via the one or more applications that have been utilized to authenticate the user (e.g., application A 405, application A 424). In other examples, a separate application may be utilized for transferring the one-time password 404/416 from mobile computing device 402 to target computing device 420. Regardless, when the target computing device 420 receives one-time-password 404/416 from mobile computing device 402, it may automatically insert it into a one-time-password field as shown on user interface 422 in target computing device sub-environment 418.

Figure 5A:
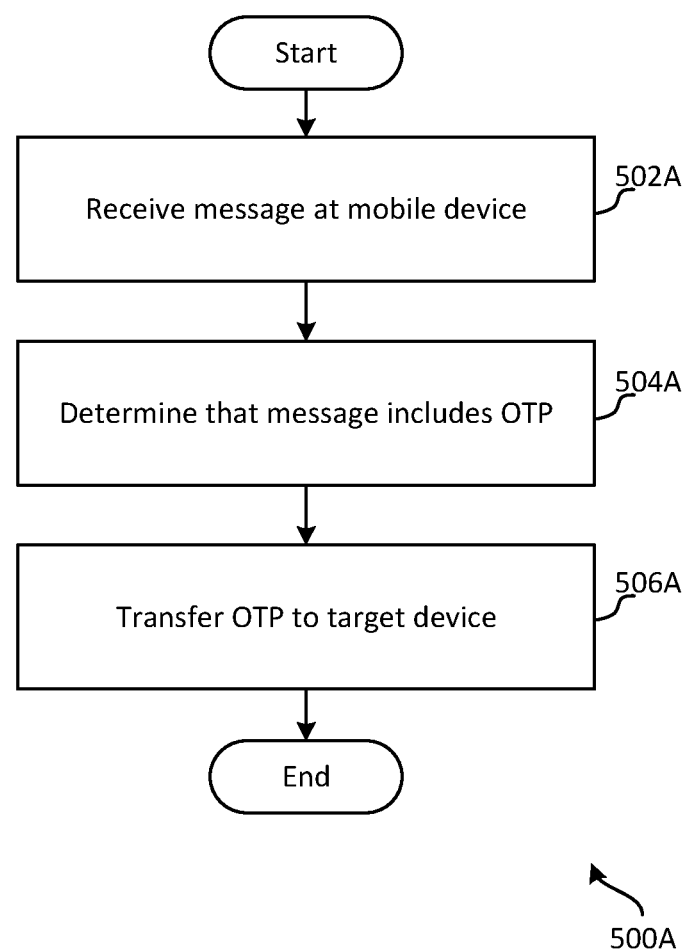
FIG. 5A is an exemplary method for assisting with cross-device access to one-time-passwords via a mobile computing device.

FIG. 5A is an exemplary method 500A for assisting with cross-device access to one-time passwords via a mobile computing device. The method 500A begins at a start operation and flow continues to operation 502A.

At operation 502A an electronic message is received by a mobile computing device. In examples, a user may have triggered the sending of the message to the mobile computing device based on an attempt to access information associated with a user account for a secure service (e.g., a banking service, a cloud-based storage service, etc.). For example, the user may have entered a username and/or a password in an application or website sign-in domain for the secure service, and the application or website may then prompt the user to verify their identity via the entering of a one-time-password that the user can have sent to a device or account that the user has associated with the account that the user is attempting to login to (e.g., the user may have added an email address to their account for the secure service that the service can email with a one-time-password, the user may have added a mobile device number for a device to their account for the secure service that the service can send an electronic message to with a one-time-password, etc.).

From operation 502A flow continues to operation 504A where a determination is made as to whether the electronic message comprises a one-time-password. In examples, the mobile computing device may analyze the content of every message that is received to determine whether each message includes a one-time-password. In other examples, the mobile computing device may determine whether the sender of each message matches a list of known senders that are known to send one-time-passwords, and only further analyze the content of those messages for which a sender is matched to the list to determine whether those messages include a one-time-password. In analyzing the content of a message to determine whether the message includes a one-time-password, the mobile computing device may apply a pattern recognition model to the message content and/or a machine learning model that has been trained on one or more manually classified datasets. In additional examples, rather than analyzing the content of messages themselves, the mobile computing device may analyze the notifications associated with those messages.

From operation 504A flow continues to operation 506A where the one-time-password is automatically transferred from the mobile computing device to the target computing device. According to examples, to ensure a secure transfer of the one-time-password from the mobile computing device to the target computing device, a trust must have been established between the two devices prior to the transfer. In some examples, the one-time-password may be transferred from the mobile computing device to the target computing device via a Bluetooth connection, and the established trust may comprise the Bluetooth pairing of the two computing devices. In other examples, the one-time-password may be transferred from the mobile computing device to the target computing device via a distributed computing network, and the established trust may comprise a public-private key authentication. For example, the mobile computing device may receive a public key for a security service that it uses to encrypt the one-time-password. The mobile computing device may send the encrypted one-time-password to the target computing device, and the target computing device may decrypt the one-time-password with a private key stored in memory. In still other examples, the established trust may comprise a cloud-based application sign-in mechanism, whereby a user signs into a cloud-based application that authenticates the user's identity on the mobile computing device, the user signs into a cloud-based application that authenticates the user's identity on the target computing device, and when both accounts have been authenticated for the user, the one-time password can be securely transmitted via a distributed computing network from the authenticated application on the mobile computing device to the authenticated application on the target computing device.

From operation 506A flow moves to an end operation and the method 500A ends.

Figure 5B:
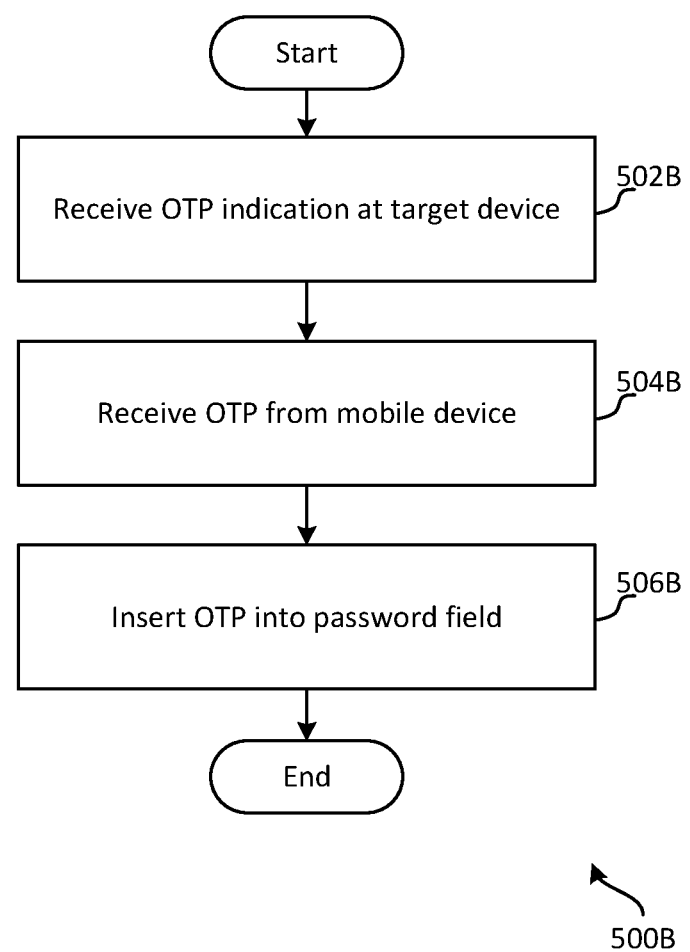
FIG. 5B is an exemplary method for assisting with cross-device access to one-time-passwords via a target computing device.

FIG. 5B is an exemplary method 500B for assisting with cross-device access to one-time passwords via a target computing device. The method 500B begins at a start operation and flow continues to operation 502B.

At operation 502B an indication to have a one-time-password for a current domain sent to a mobile computing device is received. The current domain may comprise a sign-in page for a user account associated with a secure service. The sign-in page may be presented on a website, or the sign-in page may be presented on an application. The indication to have the one-time-password sent to the mobile device from the domain may comprise the accessing user submitting the user's username and/or password for the service on via the service application and/or website.

From operation 502B flow continues to operation 504B where a one-time password is received at the target computing device from the mobile computing device. In some examples, the one-time-password may have been extracted by the mobile computing device from the electronic message it was sent in, and the extracted one-time-password may be received by the target computing device. In other examples, the electronic message containing the one-time-password may be received in its raw form by the target computing device. In still other examples, an image corresponding to a notification of the message containing the one-time-password may be received by the target computing device, and the target computing device may extract the one-time-password from that image.

According to examples, to ensure a secure transfer of the one-time password from the mobile computing device to the target computing device, a trust must have been established between the two devices prior to the transfer. As described above in relation to FIG. 5A, the established trust may comprise one or more of: a Bluetooth pairing; a public-private key mechanism; and/or a cloud-based application sign-in for both the mobile computing device and the target computing device.

From operation 504B flow continues to operation 506B where the one-time password is automatically inserted into a password field in the current domain on the target device via a browser extension. In other examples, the one-time-password may be copied to a notepad of the target computing device with a software API. In still other examples, the one-time password may be copied to a password manager for the target computing device.

From operation 506B flow moves to an end operation and the method 500B ends.

Figure 5C:
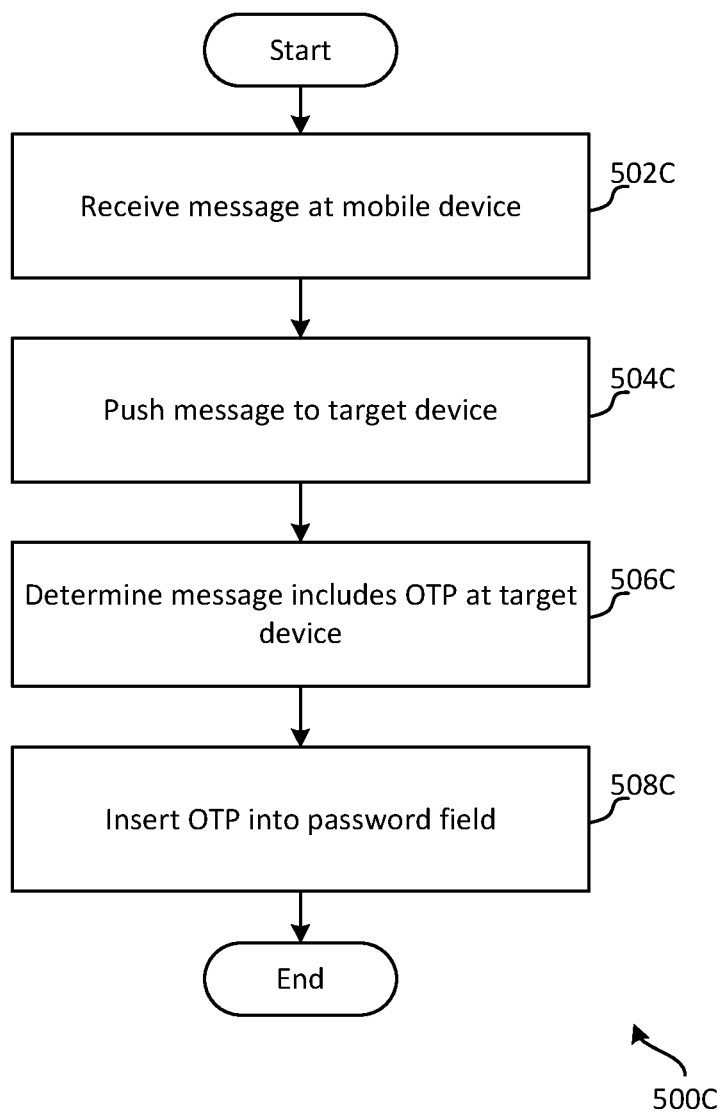
FIG. 5C is an exemplary method for assisting with cross-device access to one-time-passwords utilizing a message pushing mechanism and extraction at a target device.

FIG. 5C is an exemplary method 500C for assisting with cross-device access to one-time-passwords utilizing a message pushing mechanism and extraction at a target device. The method 500C begins at a start operation and flow moves to operation 502C where a message that includes a one-time-password is received at a mobile device. In examples, a user may have triggered the sending of the message to the mobile computing device based on an attempt to access information associated with a user account for a secure service (e.g., a banking service, a cloud-based storage service, etc.). For example, the user may have entered a username and/or a password in an application or website sign-in domain for the secure service, and the application or website may then prompt the user to verify their identity via the entering of a one-time-password that the user can have sent to a device or account that the user has associated with the account that the user is attempting to login to (e.g., the user may have added an email address to their account for the secure service that the service can email with a one-time-password, the user may have added a mobile device number for a device to their account for the secure service that the service can send an electronic message to with a one-time-password, etc.).

From operation 502C flow continues to operation 504C where the message and/or notification that includes the one-time-password is pushed directly from the mobile computing device that received the message to the target device. In examples, the message and/or notification may be pushed to the target device via a Bluetooth profile, such as Message Access Profile (MAP), Apple Notification Center Service (ANCS), or a Generic Attribute Profile (GATT). For example, if the mobile computing device that receives the message that includes the one-time-password cannot programmatically access the message/notification containing the one-time-password, it may utilize a Bluetooth profile for sending the message/notification to the target device where the one-time-password can be extracted.

From operation 504C flow continues to operation 506C where a determination is made by the target computing device that the message/notification sent to it via the Bluetooth connection from the mobile computing device includes a one-time-password. The target computing device may make this determination in a same or similar manner as described above with regard to the mobile computing device in FIG. 5A.

From operation 506C flow continues to operation 508C where the target computing device, upon determining that the message/notification includes a one-time-password, extracts the one-time-password and automatically inserts it into a password field and/or copies the one-time-password to a notepad and/or password manager on the target computing device.

From operation 508C flow continues to an end operation and the method 500C ends.

Figure 6:
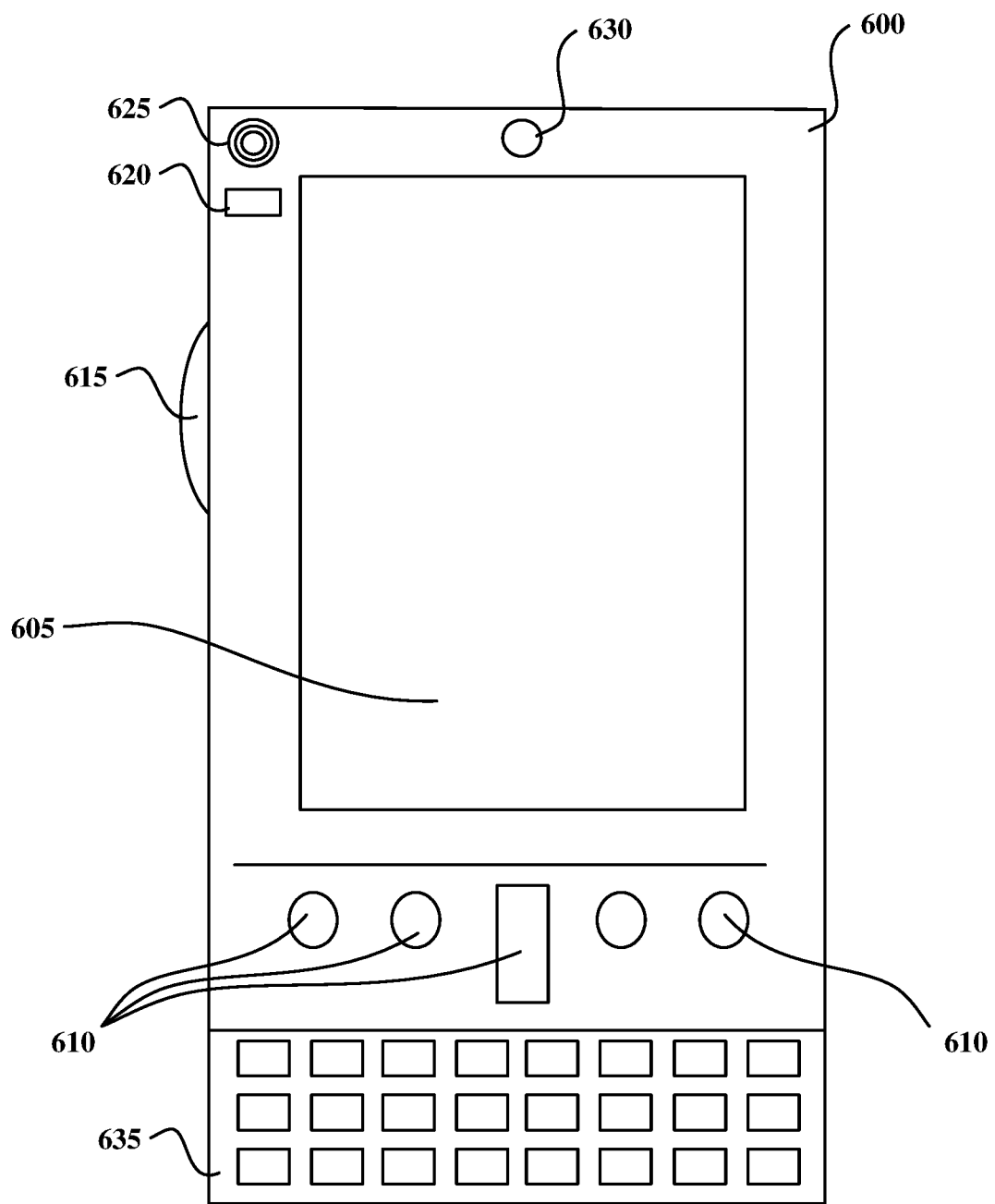
FIGS. 6 and 7 are simplified diagrams of a mobile computing device with which aspects of the disclosure may be practiced.
Figure 7:
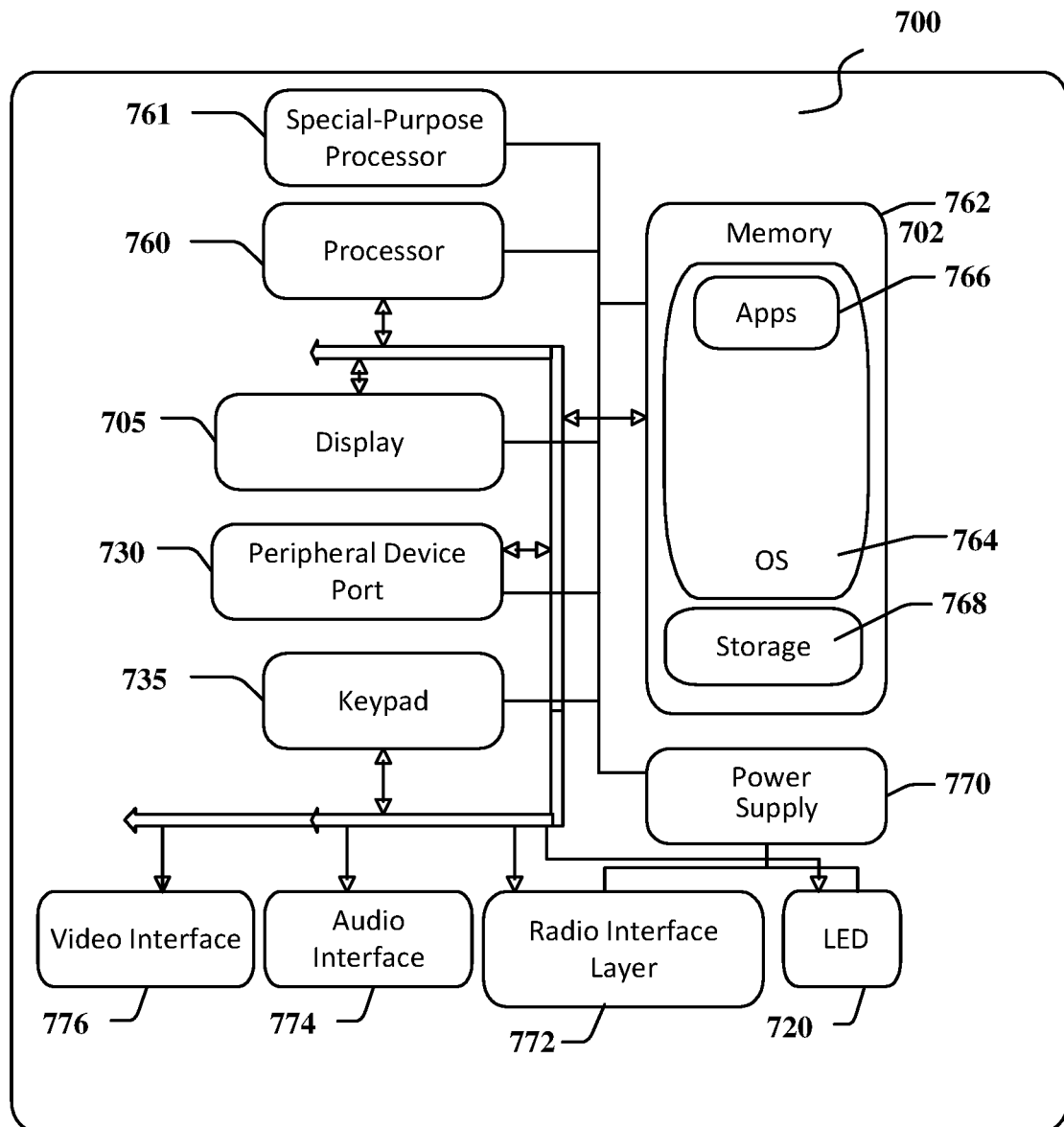

FIGS. 6 and 7 illustrate a mobile computing device 600, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or fewer input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 864. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including instructions for providing and operating a one-time-password analysis computing platform.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 620 may be used to provide visual notifications, and/or an audio interface 774 may be used for producing audible notifications via the audio transducer 625. In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
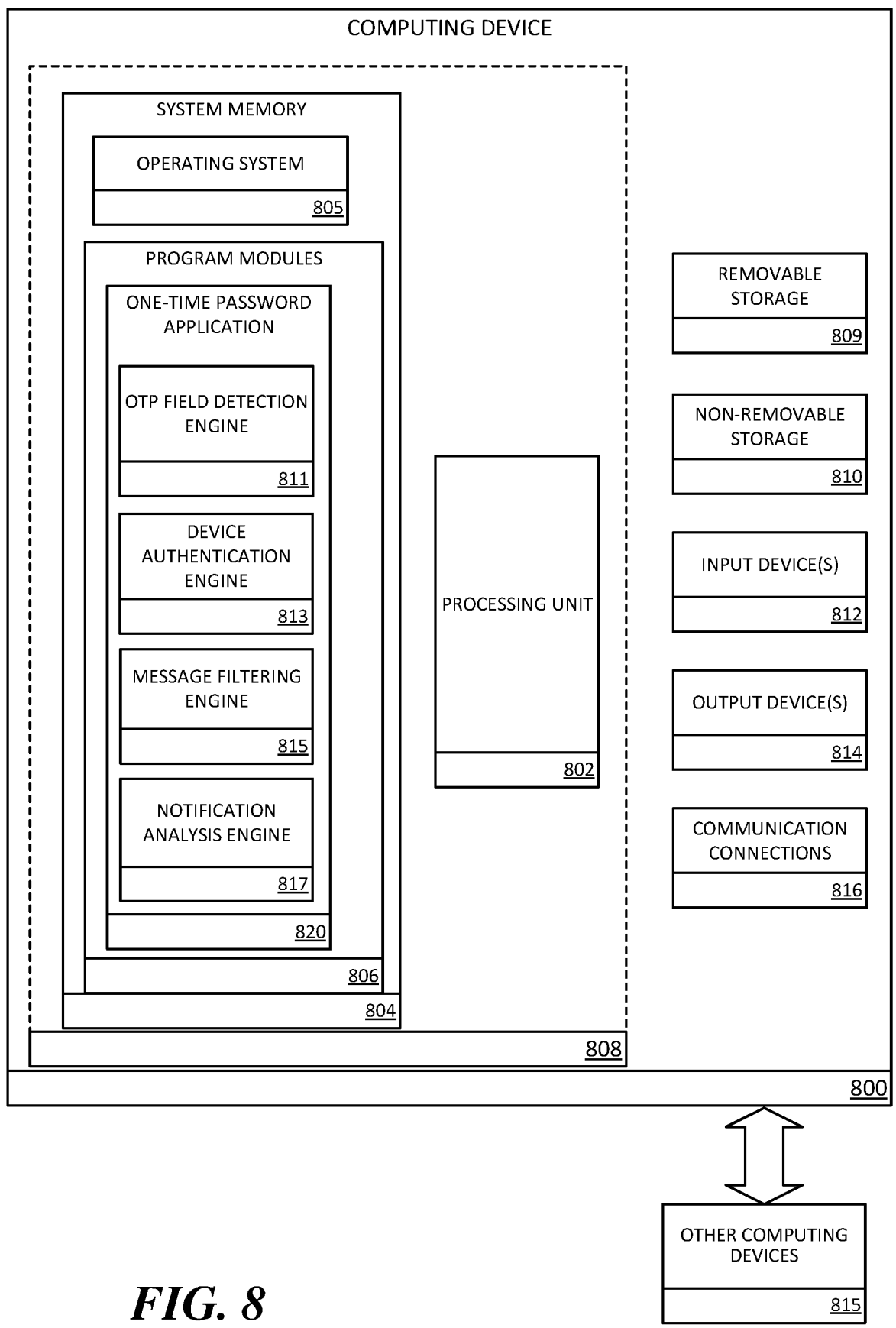
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for assisting with providing cross-device access to one-time-passwords. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running one or more one-time-password programs. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., one-time-password application 820) may perform processes including, but not limited to, the aspects, as described herein. According to examples, one-time-password field detection engine 811 may perform one or more operations associated with identifying a one-time-password field in an application and/or website, and automatically inserting a one-time-password into the one-time-password field on a target device. Device authentication engine 813 may perform one or more operations associated with authenticating a mobile computing device and a target computing device with a user to ensure secure transfer of a one-time-password from the mobile computing device to the target computing device. Message filtering engine 815 may perform one or more operations associated with filtering received messages based on senders that are known to send messages that include one-time-passwords, and only performing one-time-password identification processing on messages that are identified as being sent from those entities. Notification analysis engine 817 may perform one or more operations associated with analyzing the content of message notifications to identify whether one-time-passwords are included in the messages (i.e., analyzing the notification rather than the message itself).

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
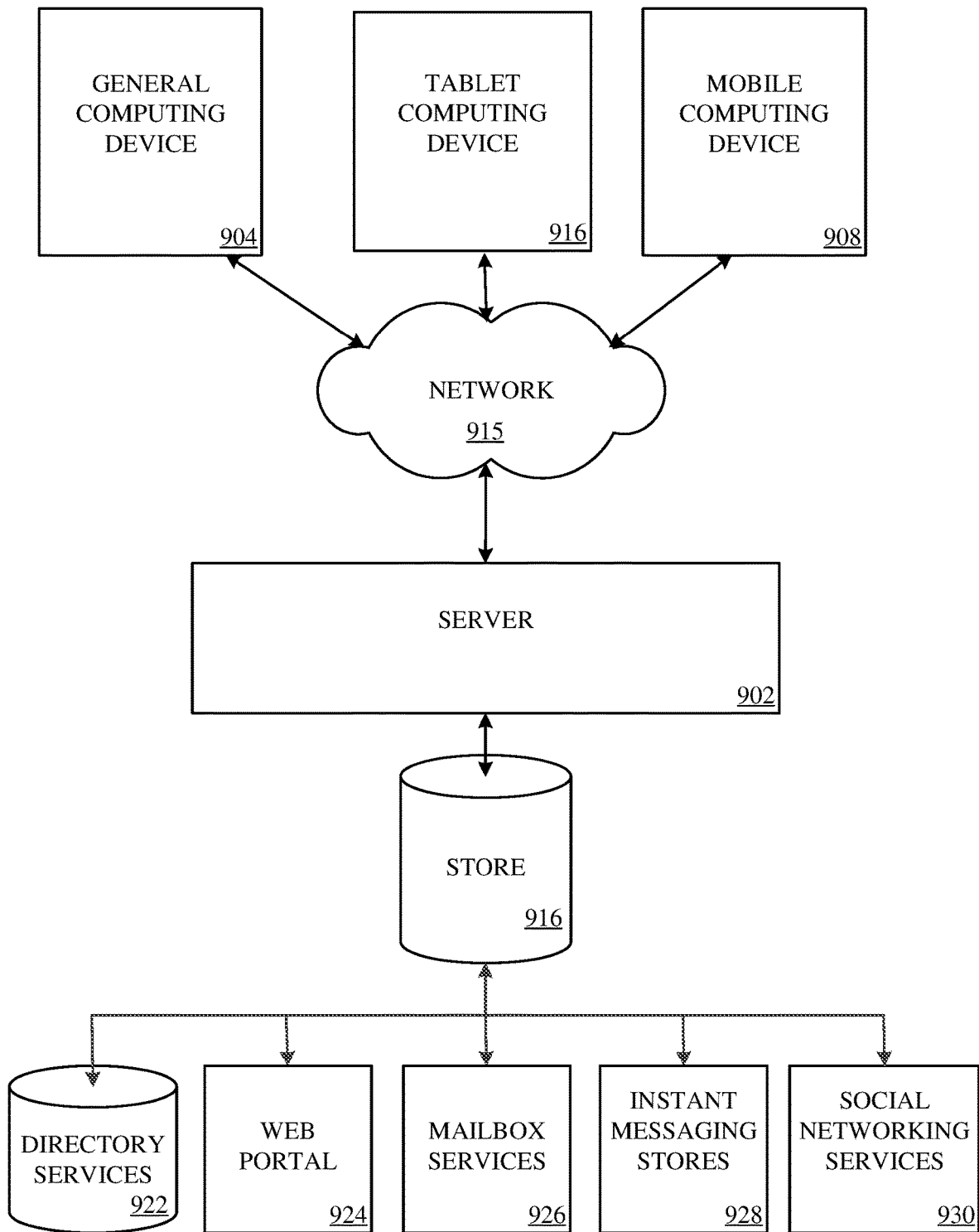
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The program modules 806 may be employed by a client that communicates with server device 902, and/or the program modules 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer system described above with respect to FIGS. 6-8 may be embodied in a personal/general computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for providing cross-device access to a one-time password, the method comprising:
    receiving, by a mobile computing device, an electronic message;
    displaying an image of a notification that includes the electronic message;
    identifying a sender of the electronic message;
    determining that the sender of the electronic message matches an identity on a known list of one-time password senders;
    analyzing, based on the determination that the sender of the electronic message matches the identity on the known list of one-time password senders, the image of the notification corresponding to the electronic message with an optical character recognition engine to determine whether the electronic message contains a one-time password;
    determining, by applying at least one of: a one-time password recognition model, and a machine learning model, that the image of the notification corresponding to the electronic message comprises a one-time password;
    automatically transferring the one-time password to a target computing device, wherein a trust has been established between the mobile computing device and the target computing device;
    receiving, by the mobile computing device, a second electronic message;
    identifying a sender of the second electronic message;
    determining that the sender of the second electronic message does not match an identity on the known list of one-time password senders; and
    filtering the second electronic message from further processing based on the determination that the sender of the second electronic message does not match an identity on the known list of one-time password senders.

2. The method of claim 1, further comprising extracting the one-time password from the electronic message.

3. The method of claim 2, wherein the one-time password is automatically sent wirelessly from the mobile computing device to the target computing device upon the one-time password being extracted from the electronic message.

4. The method of claim 3, wherein the one-time password is sent from the mobile computing device to the target computing device via Bluetooth.

5. The method of claim 3, wherein the one-time password is sent from the mobile computing device to an application on the target computing device via an API.

6. The method of claim 1, wherein the electronic message comprises an SMS message, and automatically transferring the one-time password to the target computing device comprises transferring the entirety of the SMS message to the target device.

7. The method of claim 6, further comprising extracting, by the target device, the one-time password from the SMS message.

8. The method of claim 1, wherein the established trust between the mobile computing device and the target computing device comprises at least one of: a Bluetooth trust; a public-private key trust; and a cloud-based application sign-in trust.

9. A system for providing cross-device access to a one-time password, comprising:
    a memory for storing executable program code; and
    one or more processors, functionally coupled to the memory, the one or more processors being responsive to computer-executable instructions contained in the program code and operative to:
        receive, at a target computing device, an indication to have a one-time password for a current domain sent to a mobile computing device, wherein the mobile computing device and the target computing device have an established trust;
        receive an electronic message;
        displaying an image of a notification that includes the electronic message;
        identify a sender of the electronic message;
        determine that the sender of the electronic message matches an identity on a known list of one-time password senders;
        analyze, based on the determination that the sender of the electronic message matches the identity on the known list of one-time password senders, the image of the notification corresponding to the electronic message with an optical character recognition engine to determine whether the electronic message contains a one-time password;
        determine, by applying at least one of: a one-time password recognition model, and a machine learning model, that the image of the notification corresponding to the electronic message comprises a one-time password;
        automatically insert the one-time password into a password field in the current domain;
        receive a second electronic message;
        identify a sender of the second electronic message;
        determine that the sender of the second electronic message does not match an identity on the known list of one-time password senders; and
        filter the second electronic message from further processing based on the determination that the sender of the second electronic message does not match an identity on the known list of one-time password senders.

10. The system of claim 9, wherein the established trust between the mobile computing device and the target computing device comprises a Bluetooth trust, and wherein the one-time password is received from the mobile computing device by the target computing device via a Bluetooth connection.

11. The system of claim 9, wherein the one-time password is incorporated in an SMS message form in which it was received by the mobile computing device.

12. The system of claim 11, wherein the one or more processors are further responsive to the computer-executable instructions contained in the program code and operative to:
    filter a plurality of SMS messages based on a sender of each of the plurality of SMS messages; and
    identify the SMS message based on the SMS message having a sender corresponding to the current domain.

13. A computer-readable storage device comprising executable instructions that, when executed by one or more processors, assists with providing cross-device access to a one-time password, the computer-readable storage device including instructions executable by the one or more processors for:
    receiving, by a first computing device, an electronic message;
    displaying an image of a notification that includes the electronic message;
    identifying a sender of the electronic message;
    determining that the sender of the electronic message matches an identity on a known list of one-time password senders;
    analyzing, based on the determination that the sender of the electronic message matches the identity on the known list of one-time password senders, the image of the notification corresponding to the electronic message with an optical character recognition engine to determine whether the electronic message contains a one-time password;
    determining, by applying at least one of: a one-time password recognition model, and a machine learning model, that the image of the notification corresponding to the electronic message comprises a one-time password;
    extracting the one-time password;
    automatically transferring the one-time password to a second computing device, wherein a trust has been established between the first computing device and the second computing device;
    receiving, by the first computing device, a second electronic message;
    identifying a sender of the second electronic message;
    determining that the sender of the second electronic message does not match an identity on the known list of one-time password senders; and
    filtering the second electronic message from further processing based on the determination that the sender of the second electronic message does not match an identity on the known list of one-time password senders.

14. The computer-readable storage device of claim 13, wherein the established trust between the first computing device and the second computing device comprises a Bluetooth trust, and wherein the one-time password is transferred from the first computing device to the second computing device via a Bluetooth connection.

15. The computer-readable storage device of claim 14, wherein in extracting the one-time password the instructions are further executable by the one or more processors for:
    extracting the one-time password from the image of the notification corresponding to the electronic message.

16. The computer-readable storage device of claim 13, wherein the one-time password is transferred from the first computing device to an application on the second computing device via an API.

17. The computer-readable storage device of claim 13, wherein the electronic message comprises an SMS message, and automatically transferring the one-time password to the second computing device comprises transferring the entirety of the SMS message to the second computing device.

18. The computer-readable storage device of claim 13, wherein the established trust between the first computing device and the second computing device comprises a public-private key trust.

19. The computer-readable storage device of claim 13, wherein the established trust between the first computing device and the second computing device comprises a cloud-based application sign-in trust.

* * * * *